United States Patent [19]

Hattori et al.

[11] Patent Number: 4,462,247

[45] Date of Patent: Jul. 31, 1984

[54] KNOCK DETECTING APPARATUS FOR INTERNAL COMBUSTION ENGINES

[75] Inventors: Tadashi Hattori, Okazaki; Masanori Hanaoka; Yukihide Hashiguchi, both of Toyoda; Yoshinori Ootsuka, Okazaki; Hiroaki Yamaguchi, Anjo, all of Japan

[73] Assignees: Nippon Soken, Inc., Nishio; Toyota Jidosha Kogyo Kabushiki Kaisha, Toyota, both of Japan

[21] Appl. No.: 354,434

[22] Filed: Mar. 3, 1982

[30] Foreign Application Priority Data

Mar. 6, 1981 [JP] Japan .................................. 56-32859

[51] Int. Cl.³ ............................................. G01L 23/22
[52] U.S. Cl. ........................................ 73/35; 73/658; 73/706; 73/728; 73/DIG. 4; 310/338
[58] Field of Search .................. 73/35, 658, 706, 717, 73/722, DIG. 4, 754; 310/155, 323, 324, 326, 327, 338; 92/97

[56] References Cited

U.S. PATENT DOCUMENTS

| 2,532,620 | 12/1950 | Higgs | 73/35 |
| 2,569,987 | 10/1951 | Frondel | 73/DIG. 4 |
| 4,299,117 | 11/1981 | Andrews et al. | 73/35 |
| 4,366,702 | 1/1983 | Yamaguchi et al. | 73/35 |

Primary Examiner—Gerald Goldberg
Assistant Examiner—John E. Chapman, Jr.
Attorney, Agent, or Firm—Cushman, Darby & Cushman

[57] ABSTRACT

A knock detecting apparatus for detecting the occurrence of knocking in an internal combustion engine by detecting variations in the pressure of engine cooling water. A sealed double diaphragm structure is formed by a first diaphragm which is directly responsive to variations in the cooling water pressure and not resonant at the knock frequencies and a second diaphragm which is resonant at the knock frequencies. A noncompressible fluid is contained in the sealed double diaphragm structure between the two diaphragms. Pulsations of the second diaphragm, resonant at the knock frequencies, are detected by a magnetic device or a piezoelectric device operative to output an ac signal.

4 Claims, 4 Drawing Figures

KNOCK DETECTING APPARATUS FOR INTERNAL COMBUSTION ENGINES

BACKGROUND OF THE INVENTION

1. Field of the Invention

The present invention relates to a knock detecting apparatus for internal combustion engines in which the occurrence of knocking in an engine is detected so as to control the ignition timing optimally. More particularly, the invention relates to a knock detecting apparatus which detects the occurrence of knocking from the cooling water pulsations due to the fact that the pressure vibrations caused by the occurrence of knocking in the engine cylinder propagate into the cooling water through the cylinder wall.

2. Description of the Prior Art

It is well known in the art that there is a close correlation between the timing of ignition and cylinder pressure. When a mixture is exploded but no knock is present, there occurs no superposition on the cylinder pressure of any higher frequency components (usually the frequency components in the ranges of 5 to 10 kHz and 11 to 13 kHz which fall in the frequency bands each determined by the engine cylinder bore diameter and the velocity of sound in the combustion and which are produced by the intermittent and rapid combustion). Upon occurrence of knock, such higher frequencies become superimposed on the cylinder pressure at around the peak cylinder pressure value and this has the effect of producing vibrations or sound outside the cylinder. Examination of the pressure signals generated inside the cylinders and detected as vibrations or sound outside the cylinders shows that the occurrence of knock (trace knock) commences at an engine crank angle at which the cylinder pressure attains the peak value and that as the knock is increased gradually (to light knock and then to heavy knock) a phenomenon occurs in which the higher frequency components start to superpose considerably on the cylinder pressure earlier (or on the ignition side) than the peak cylinder pressure crank angle.

As a result, it is possible to determine the presence of knocking by detecting the presence of engine vibrations due to the higher frequency components. The vibrations due to knocking occur within the lower frequency range of 5 to 10 kHz and the higher frequency range of 11 to 13 kHz as mentioned previously. Thus, if a diaphragm which is resonant at the cooling water pressure pulsations within these frequency ranges is used to detect the water pressure pulsations, it is possible to detect the occurrence of knocking with a high degree of accuracy.

However, because these water pressure pulsations are usually lower than 0.1 kg/cm$^2$ and it is the usual practice to apply a hydrostatic pressure of 0.9 to 1.5 kg/cm$^2$ to the cooling water system, preferably the hydrostatic pressure in the cooling water system should be eliminated and only the pulsation components should be detected.

SUMMARY OF THE INVENTION

Therefore, the invention provides, as a means of eliminating the effect of the hydrostatic pressure applied to the cooling water system, a knock detecting apparatus including a diaphragm which is movable in resonance at the knock-induced water pressure pulsations. The apparatus is reponsive only alternating-currentwise to the movement of the diaphragm, thereby detecting only the water pressure pulsations with a high degree of accuracy.

It is known that if only a single diaphragm is provided which is movable in resonance at the knock-induced water pressure pulsations is exposed to the cooling water for knock detecting purposes, there is the danger of the diaphragm being fastened with the extraneous matter in the cooling water, rust and the like, with the resulting variation of the initially set resonant frequencies and hence the deterioration of the response sensitivity to the knocking.

With a view to overcoming the foregoing deficiencies, it is the primary object of the invention to provide a knock detecting apparatus comprising a sealed double first diaphragm structure including a diaphragm exposed to the cooling water so as to be directly responsive to variations in the water pressure but not resonant or responsive to the knocking frequencies and a second diaphragm resonant at the knock frequencies and opposed to the first diaphragm to cooperate therewith to define a chamber filled with a noncompressible fluid, thereby preventing any variation in the initially set resonant frequencies of the second diaphragm and preventing deterioration of the response sensitivity of the apparatus to the knocking frequencies.

DESCRIPTION OF THE PREFERRED EMBODIMENTS

Figure 1:
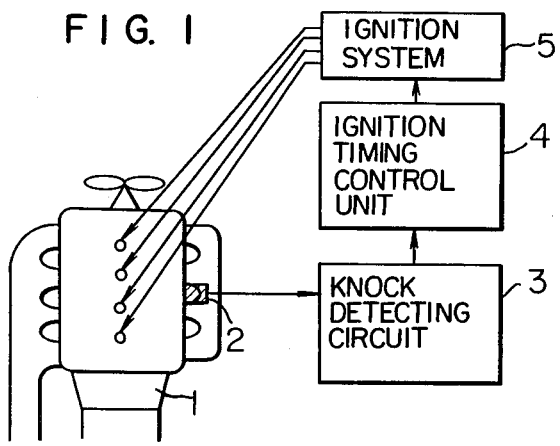
FIG. 1 is a schematic block diagram showing the construction of a knock feedback ignition system.
Figure 2:
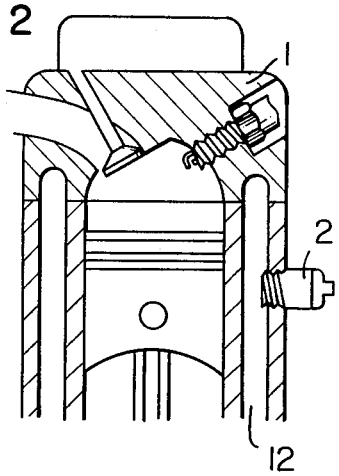
FIG. 2 is a schematic diagram showing the manner in which a knock detecting apparatus of this invention is mounted.

The present invention will now be described in greater detail with reference to the illustrated embodiments. FIGS. 1 and 2 are schematic diagrams showing respectively the construction of a knock feedback ignition system incorporating a knock detecting apparatus according to the invention and the manner in which the knock detecting apparatus is mounted. In the Figures, numeral 1 designates a four-cylinder in-line type engine, and a knock detecting apparatus 2 is screwed in such a manner that one end is exposed into a cooling water line 12 surrounding the outer wall surface of an engine cylinder. Numeral 3 designates a knock detecting circuit for detecting the occurrence of knocking in the engine from an output signal of the knock detecting apparatus 2, and 4 an ignition timing control circuit responsive to an output of the detecting circuit 3 to retard the ignition timing to the optimum position. The output signal from the control unit 4 is applied by way of a known type of ignition system 5 to the spark plugs which are mounted in the engine 1 to ignite a mixture. The knock detecting circuit 3 used in this system detects an ignition signal so that during a predetermined knock-free period or crank angle just after the ignition a noise component due to the engine vibration is sampled by means of the output from the detecting apparatus 2 and compared with a sensor output generated during a predetermined time or crank angle after the top dead center or TDC (after the peak cylinder pressure) where there is a knocking tendency (or the integrated value or the averaged value may sometimes be used) so as to detect the presence of knocking. Alternatively, the presence of knocking may be detected on the basis of a percentage of knocking events per 100 times of ignition. The detecting apparatus of this invention is usable irrespective of its detection and control methods provided that it detects the ordinary knocks and controls the ignition timing. Thus, the details of the control system will not be described.

Figure 3:
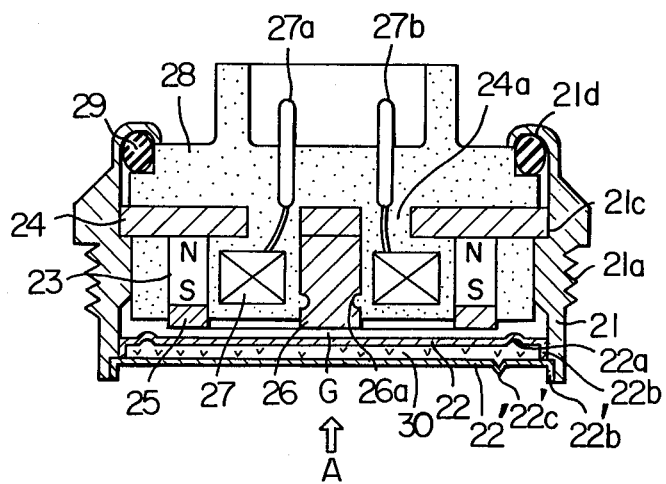
FIG. 3 is a longitudinal sectional view of a first embodiment of the knock detecting apparatus according to the invention.

FIG. 3 shows a detailed construction of a first embodiment of the knock detecting apparatus for internal combustion engines according to the present invention. Numeral 21 designates a housing having a mounting threaded portion 21a in the lower part thereof. Numeral 22' designates a disk diaphragm attached to the housing 21 by welding its entire periphery along the lowermost end portion of the housing 21 and exposed to the cooling water so as to be directly responsive to variations in the water pressure. However, the diaphragm 22' is of the type which is nonresonant at the knocking frequencies. Numeral 22 designates another disk diaphragm which is positioned above and opposite to the diaphragm 22' and which is attached to the housing 21 by welding its entire peripheral edge along the lower end portion of the housing 21. The diaphragm 22 has a resonant frequency to resonate at the knocking frequencies and the resonant frequencies are presettable by adjusting the diameter of a frame 22a. The frame 22a is provided by forming a fold concentrically on the disk diaphragm 22. The diaphragms 22 and 22' cooperate to define therebetween a sealed chamber which is filled with a non-compressible fluid or oil 30 introduced through a hole 22'c. Then the hole 22'c is closed. Numeral 23 designates a cylindrical magnet made from ferrite, alnico or the like and magnetized along the cylindrical wall thereof as shown in FIG. 3, 24 a magnetic plate formed into a disk shape and having a driving fit portion formed at the outer periphery and a hole 24a formed centrally therethrough, and 25 a ring magnetic material connected to the magnet 23. Numeral 26 designates a cylindrical central magnetic path member integrally attached to the magnetic plate 24 by welding or the like and having a recess 26a formed in the middle portion of a cylindrical outer surface thereof. Numeral 27 designates a coil for detecting a change in the magnetic flux caused by a change in the reluctance of the central magnetic path. The coil 27 generates an output voltage in accordance with the amount of change per unit time of the magnetic flux. The voltage produced in the coil 27 is delivered to the outside of the detecting apparatus by way of output terminals 27a and 27b. Numeral 28 designates a body of a plastic material molded to assemble and secure together the magnetic plate 24, the magnet 23, the magnetic material 25, the central magnetic path member 26, the coil 27 and the output terminals 27a and 27b into an integral unit. Numeral 29 designates an O-ring. The preliminarily molded integral unit including the magnet 25, the coil 27, the magnetic plate 24, the central magnetic path member 26, etc., is fitted to housing 21 such that the outer periphery of the magnetic plate 24 rests on the stepped portion on an inner surface portion 21c of the housing 21, is sealed by the O-ring 29 and is fixed in place by inwardly bending the entire periphery of a housing upper part 21d over the O-ring. An air gap G is formed between the end of the central magnetic path member 26 and the lower surface of the magnetic material 25 and the upper surface of the diaphragm 22. The diaphragm 22 is made from a plate of a magnetic material (e.g., Fe or magnetic stainless steel). As a result, when the diaphragm 22 is displaced so that the air gap G is varied, the magnetic flux passing through the magnetic circuit is varied.

Next, the operation of the knock detecting apparatus according to the invention will be described. When knocking occurs, water pressure pulsations occur in the engine cooling system so that the water pressure pulsations are propagated via the cooling water and applied in the direction of the arrow A to the diaphragm 22' of the detecting apparatus 2 which is exposed to the cooling water, so that the diaphragm 22' makes a pulsational displacement in response to the water pressure pulsations and this pulsational displacement is propagated through the non-compressible fluid 30 thus causing the diaphragm 22 to make a pulsational displacement and thereby causing the air gap G to vary. In this case, when the propagated water pressure pulsations attain the same frequency as the knock frequency, the diaphragm 22 resonates so that the amount of displacement of the diaphragm 22 is increased and thus the amount of change of the air gap G is increased. The magnetic flux produced in the magnetic circuit comprising the magnet 23, the magnetic material 25, the diaphragm 22 made from a magnetic material, the central magnetic path member 26 and the magnetic plate 24 is changed in accordance with the amount of change of the air gap G. Thus the coil 27 generates an output in the form of an ac signal. This output is applied to the knock detecting circuit 3 shown in FIG. 1 via the output terminals 27a and 27b so that the ignition timing is controlled in the manner described previously.

With this embodiment, even if the diaphragm 22' exposed to the cooling water is fastened with any extraneous matter, rust or the like, the diaphragm 22 which is in contact with the noncompressible fluid 30 will not be fastened with any extraneous matter, rust or the like, with the result that the resonant frequency of the knock detecting diaphragm 22 is not varied and thus the knock detecting sensitivity is not deteriorated.

Figure 4:
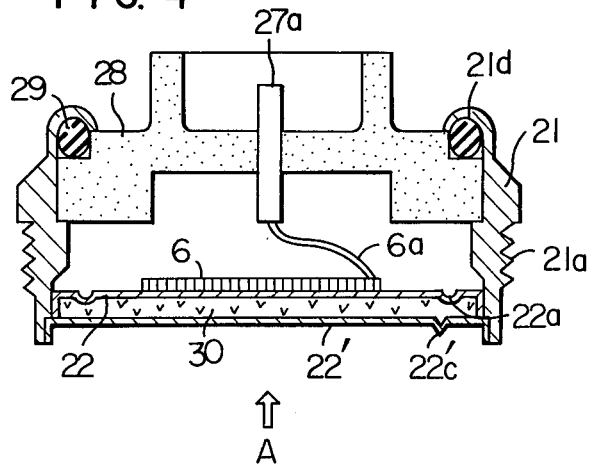
FIG. 4 is a longitudinal sectional view showing a detailed construction of a second embodiment of the invention.

FIG. 4 shows the construction of a second embodiment of the knock detecting apparatus according to the invention which is identical with the first embodiment of FIG. 1 in that the sealed double diaphragm structure comprises the non-resonant type diaphragm 22' exposed to the cooling water and the diaphragm 22 having the preset resonant frequency to resonate at the knock frequencies and that the noncompressible fluid 30 is sealed into the structure. In this second embodiment, however, a piezoelectric element 6 is attached by an electrically conductive adhesive, sputtering or the like to a part of the upper surface of the disk diaphragm 22. The diaphragm 22 is grounded via the housing 21. A thin-film electrode (not shown) is attached to the other surface of the piezoelectric element 6 and connected to the output terminal 27a by a lead wire 6a.

With this detecting apparatus, when the knock-induced water pressure pulsations propagating through the cooling water cause the diaphragm 22 to pulsate via the diaphragm 22' and the noncompressible fluid 30, a stress is applied to the piezoelectric element 6 so that an electric signal is generated directly and applied via the lead wire 6a and the output terminal 27a to the knock detecting circuit 3, thereby controlling the ingition timing.

The sealed double diaphragm structure of this invention is not intended to be limited to the above-mentioned embodiments but is applicable to any other types of knock detecting apparatus which detect only the water pressure pulsations caused by the knock and propagated through the cooling water. From the foregoing it will be seen that in accordance with the knock detecting apparatus of this invention, since a sealed double diaphragm structure comprises a diaphragm exposed to the cooling water and directly responsive to variations in the water pressure but not resonant at the knock frequencies, another diaphragm having a preset resonant frequency to resonate at the knock frequencies and a noncompressible fluid sealed into the structure, there is a great advantage that the other diaphragm which is resonant at the knock frequencies will not be fastened with any extraneous matter and the preset resonant frequency of the other diaphragm will not be varied thereby preventing deterioration of the knock detecting sensitivity of the other diaphragm. Another great advantage is that since pulsations of the diaphragm resonant at the knock frequencies are detected as an ac signal by the magnetic or piezoelectric means and since the pressure propagation in the water has a lesser damping tendency than the propagation of block vibrations, the occurrence of knocking in the number of the engine cylinders can be detected simultaneously by the single knock detecting apparatus. Still another advantage is that a knock detecting apparatus provided in accordance with the invention has a less tendency to cause knock detecting error and is excellent in accuracy.

Further advantages are that a knock detecting apparatus provided in accordance with the present invention is simple in construction and low in cost since only the water pressure pulsations detected by diaphragms are taken out in the form of ac signals by magnetic means or piezoelectric means, and that the diaphragms may be of the high sensitivity construction for small pressure detecting purposes with the resulting greater knock detecting accuracy.

We claim:

1. A knock detecting apparatus for detecting knocking pressure variations in cooling water of an engine, said apparatus comprising:
    a first diaphragm for being exposed to said cooling water and being responsive to pressure variations therein, said first diaphragm being non-resonant at knock frequencies to be detected;
    a second diaphragm, resonant at said knock frequencies to be detected said first and second diaphragms being arranged to form a sealed double diaphragm structure;
    a noncompressible fluid contained in said sealed double diaphragm structure and entirely filling the region between said diaphragms for transmitting vibrations of said first diaphragm; and
    means for detecting vibrations of said second diaphragm transmitted thereto via said noncompressible fluid and producing, in response thereto, an electrical signal indicative thereof.

2. An apparatus according to claim 1, wherein said vibration detecting means comprises a magnetic circuit including magnetic field generating means and said second diaphragm, and magnetic flux detecting means for detecting magnetic flux changes in said magnetic circuit caused by vibrations of said second diaphragm.

3. An apparatus according to claim 1, wherein said vibration detecting means comprises piezoelectric means attached to said second diaphragm.

4. An apparatus according to claim 1, wherein said second diaphragm is resonant at a predetermined knocking frequency which falls within either a lower or higher frequency range, said lower range being from 5 to 10 KHz and said higher range being from 11 to 13 KHz.

* * * * *